US008549360B2

(12) United States Patent
Masser et al.

(10) Patent No.: US 8,549,360 B2
(45) Date of Patent: Oct. 1, 2013

(54) EARLY COLLECTION OF DIAGNOSTIC INFORMATION

(75) Inventors: Joel Leslie Masser, San Jose, CA (US);
David Charles Reed, Tucson, AZ (US);
Max Douglas Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 373 days.

(21) Appl. No.: 12/986,630

(22) Filed: Jan. 7, 2011

(65) Prior Publication Data
US 2012/0179936 A1 Jul. 12, 2012

(51) Int. Cl.
*G06F 11/00* (2006.01)
(52) U.S. Cl.
USPC ........................................ 714/38.12
(58) Field of Classification Search
USPC ........................................ 714/38.12
See application file for complete search history.

(56) References Cited

U.S. PATENT DOCUMENTS

| 7,337,365 | B2 * | 2/2008 | Zunino et al. | 714/38.11 |
| 7,383,470 | B2 * | 6/2008 | Canning et al. | 714/38.11 |
| 7,415,635 | B1 * | 8/2008 | Annangi | 714/38.12 |
| 2004/0098640 | A1 | 5/2004 | Smith | 714/39 |
| 2007/0104105 | A1 * | 5/2007 | MeLampy et al. | 370/235 |
| 2009/0193298 | A1 | 7/2009 | Mukherjee | 714/38 |
| 2010/0088683 | A1 | 4/2010 | Golender et al. | 717/128 |

* cited by examiner

*Primary Examiner* — Bryce Bonzo
(74) *Attorney, Agent, or Firm* — John H. Holcombe

(57) ABSTRACT

Generation of diagnostic information of a computer-implemented system is made early so that the data is closer to the causation of errors or for performance analysis. At least one selected activity of the system is monitored from initiation of the activity, and the monitoring is for successful completion. Early collection of diagnostic information is provided by comparing the time of the activity without successful completion to an initial trigger, where the initial trigger is less than the time period for a time-out for the activity. If the time of the activity without successful completion exceeds the initial trigger, diagnostic information is collected and an initial dump of the diagnostic information is taken. In one example, a notification that the dump of diagnostic information has been taken is directed to the host or diagnostic terminal.

20 Claims, 3 Drawing Sheets

EARLY COLLECTION OF DIAGNOSTIC INFORMATION

FIELD OF THE INVENTION

This invention relates to computer-implemented system, and more particularly to collection of diagnostic information with respect to such systems.

BACKGROUND OF THE INVENTION

Computer-implemented systems, during operation, occasionally can suffer a hang or non-terminating loop within the system. By the time the hang or non-terminating loop is detected, the data collected to diagnose the problem may be too late and of limited usefulness. If there is no definite hang, but there is performance degradation, it may be some time before the degradation is detected and analyzed.

SUMMARY OF THE INVENTION

Methods, computer program products and computer-implemented systems are provided to generate diagnostic information of a computer-implemented system early so that the data is collected early and for performance analysis.

In one embodiment of a computer-implemented system, the following is performed:

monitoring at least one selected activity of the computer-implemented system from initiation for successful completion;

comparing the time of the activity without successful completion to an initial trigger, the initial trigger less than the time period for a time-out for the activity; and if the time of the activity without successful completion exceeds the initial trigger, collecting and taking an initial dump of diagnostic information.

In a further embodiment, if the activity fails to complete successfully by the time-out period, notification is provided that the initial dump of diagnostic information has been taken.

In a still further embodiment, if the initial trigger is exceeded but the activity completes successfully by the time-out period, the initial dump of diagnostic information is deleted, and the occurrence of the initial dump is logged.

In another embodiment, if the initial trigger is exceeded but the activity completes successfully by the time-out period, the initial dump of diagnostic information is retained and an alternate notification is provided.

In still another embodiment, the initial trigger comprises a multiple of a measured standard deviation of times for successful completion of the activity.

In a further embodiment, the selected activity is initially analyzed to ascertain a statistical basis for determining the standard deviation.

In a still further embodiment, false positive activation of the initial trigger comprises successful completion of activity subsequent to the initial trigger; missed activation of the initial trigger comprises indication of an error related to the activity without activation of the initial trigger; and the initial trigger is adjustable in response to the false positive activation and the missed activation.

In another embodiment, subsequent to the initial trigger and the initial dump, successive collection and dumps of diagnostic information are taken with respect to the activity so long as the activity fails to complete successively and before the time-out period is exceeded.

In a further embodiment, the initial trigger comprises a multiple of a measured standard deviation of times for successful completion of the activity, and each successive collection and dump is taken at a timing having an exponential increase over the initial trigger, such that fewer dumps are taken as the activity proceeds.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
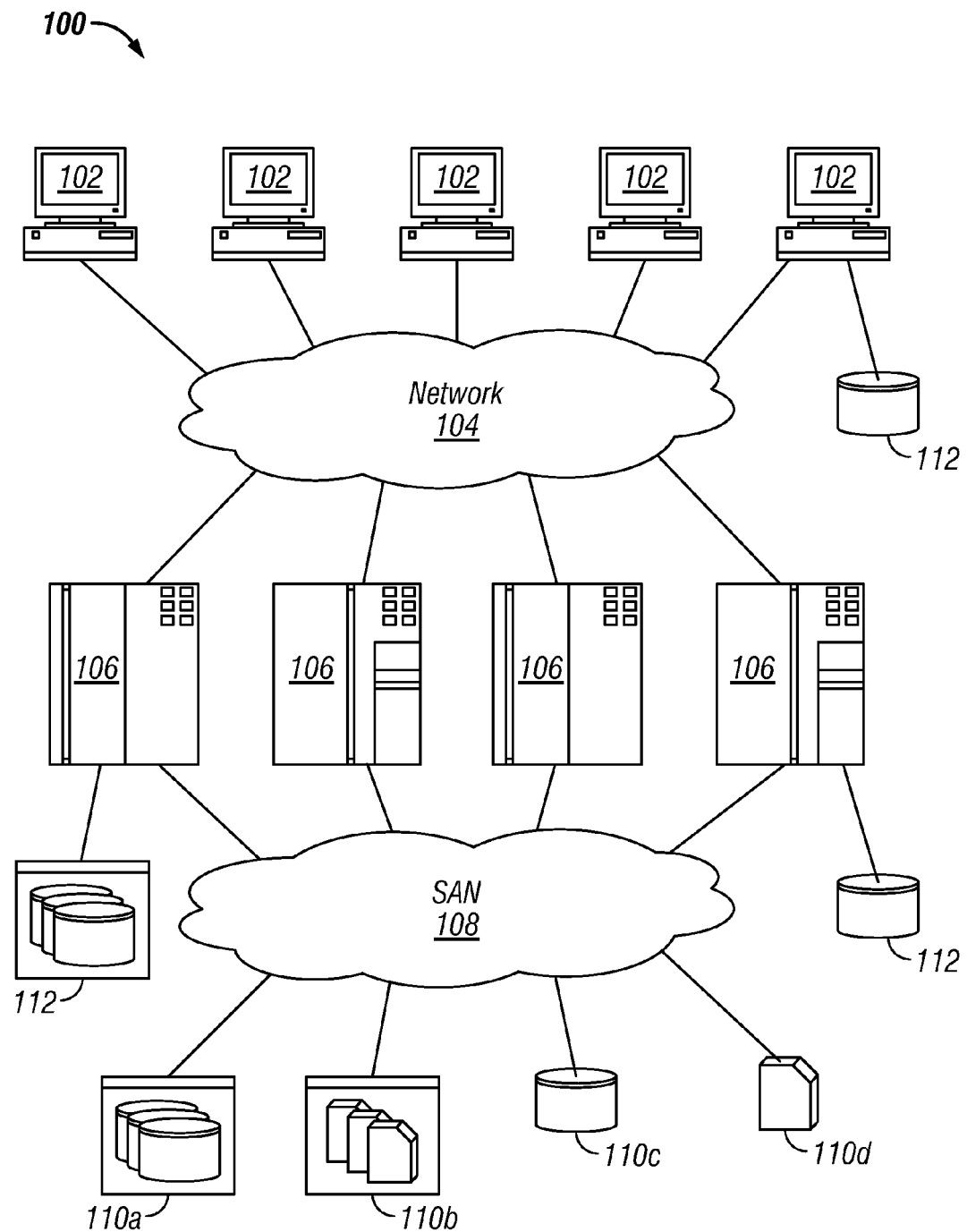
FIG. 1 is a high-level block diagram showing one example of a computer-implemented system in a network environment made up of different types of computing devices.

Referring to FIG. 1, an example of a computer-implemented system 100 is illustrated. The system is one of many computer-implemented systems which may implement the present invention to monitor selected activities of the system and collect diagnostic information. The system architecture 100 is presented to show various types of computing devices that may benefit from the apparatus and methods disclosed herein. The system architecture 100 is presented only by way of example and is not intended to be limiting. Indeed, the apparatus and methods disclosed herein may be applicable to a wide variety of different computing devices and is not limited to those illustrated herein.

As shown, the exemplary system architecture 100 includes one or more computer processors 102, 106 interconnected by a network 104. The network 104 may include, for example, a local-area-network (LAN), a wide-area-network (WAN), the Internet, an intranet, or the like. In certain embodiments, the computer processors 102, 106 may include both client computer processors 102 and server computer processors 106. In the example, the client computers 102 initiate communication sessions, whereas the server computer processors 106 wait for requests from the client computer processors 102. In certain embodiments, the computer processors 102 and/or server processors 106 may connect to one or more internal or external direct-attached storage systems 112 (e.g., hard-disk drives, solid-state drives, tape drives, libraries, etc.). These computer processors 102, 106 and direct-attached storage systems 112 may communicate using protocols such as ATA, SATA, SCSI, SAS, Fibre Channel, or the like.

The system architecture 100 may, in certain embodiments, include a storage network 108 behind the server processors 106, such as a storage-area-network (SAN) or a LAN (e.g., when using network-attached storage). This network 108 may connect the server processors 106 to one or more storage systems 110, such as arrays 110a of hard-disk drives or solid-state drives, tape libraries 110b, individual hard-disk drives 110c or solid-state drives 110c, tape drives or libraries 110d, CD-ROM libraries, virtual tape libraries, or the like. To access a storage system 110, a server processor 106 may communicate over physical connections from one or more ports on the server processor 106 to one or more ports on the storage system 110. A connection may be through a switch, fabric, direct connection, or the like. In certain embodiments, the server processors 106 and storage systems 110 may communicate using a networking standard such as Fibre Channel (FC).

Figure 2:
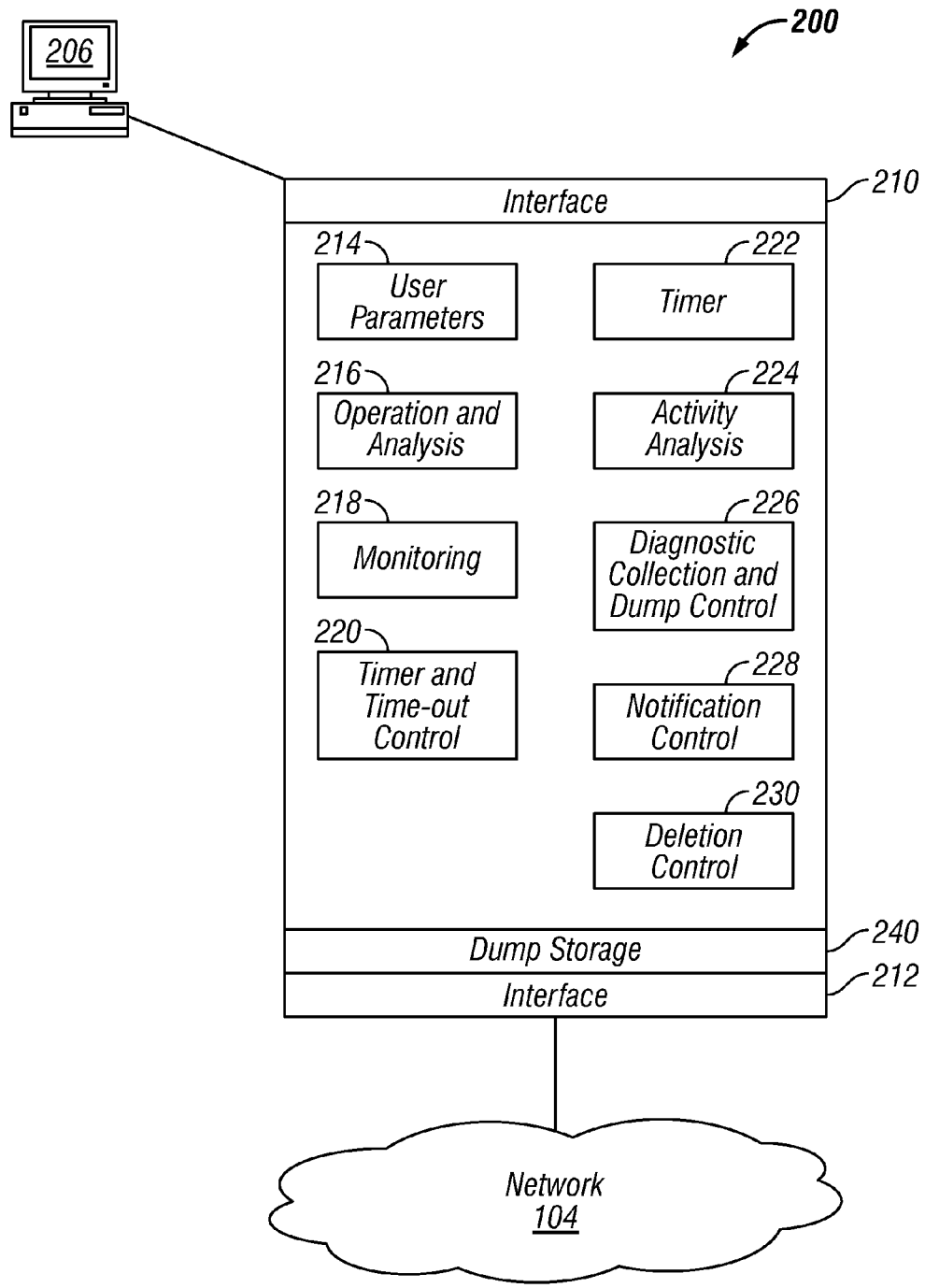
FIG. 2 is a high-level block diagram showing one embodiment of a computer-implemented system for monitoring activity of the computer-implemented system of FIG. 1 and collecting diagnostic information.

Referring to FIG. 2, one embodiment of a computer-implemented system 200 for monitoring selected activities of the system 100 of FIG. 1 and collecting diagnostic information is illustrated. The computer-implemented system 200 may be implemented in any of the devices or systems of FIG. 1, including a client system 102, a server processor 106, a storage system 110, and attached storage 112, or in another computer-implemented system connected via network 104. As shown, the computer-implemented system 200 comprises one or more modules to provide the monitoring and diagnostic collection. The modules may be located at one or more computer processors and one or more associated computer-usable storage medium/media having non-transitory computer-usable program code embodied therein. The details of the computer processors and computer-usable storage medium/media are discussed hereinafter. The computer-implemented system 200 may receive commands, information and the computer-usable program code, and provide notifications and information to, one or more host or diagnostic terminals 206. These modules may comprise one or more of an interface 210, another interface 212, a module 214 to receive and store user parameters, an operation and analysis module 216, a monitoring module 218, a timer and time-out control module 220, a timer 222, an activity analysis module 224, a diagnostic information collection and dump control module 226, a notification control module 228, and a deletion control module 230. The computer-implemented system also comprises storage 240 to provide the dump of diagnostic information. The computer-implemented system may be operational to monitor activities and collect diagnostic information within a server processor or client processor, or may connect to the network 104 to monitor activities and collect diagnostic information relating to other computer processors of the computer-implemented system 100 of FIG. 1.

Although illustrated as grouped together, the modules and other elements may be spread among various computer processors and systems, as discussed above. The interfaces 210 and 212 comprise the connectivity to communicate externally with respect to the modules and dump storage, and as needed among the various computer processors and systems to other modules.

Figure 3:
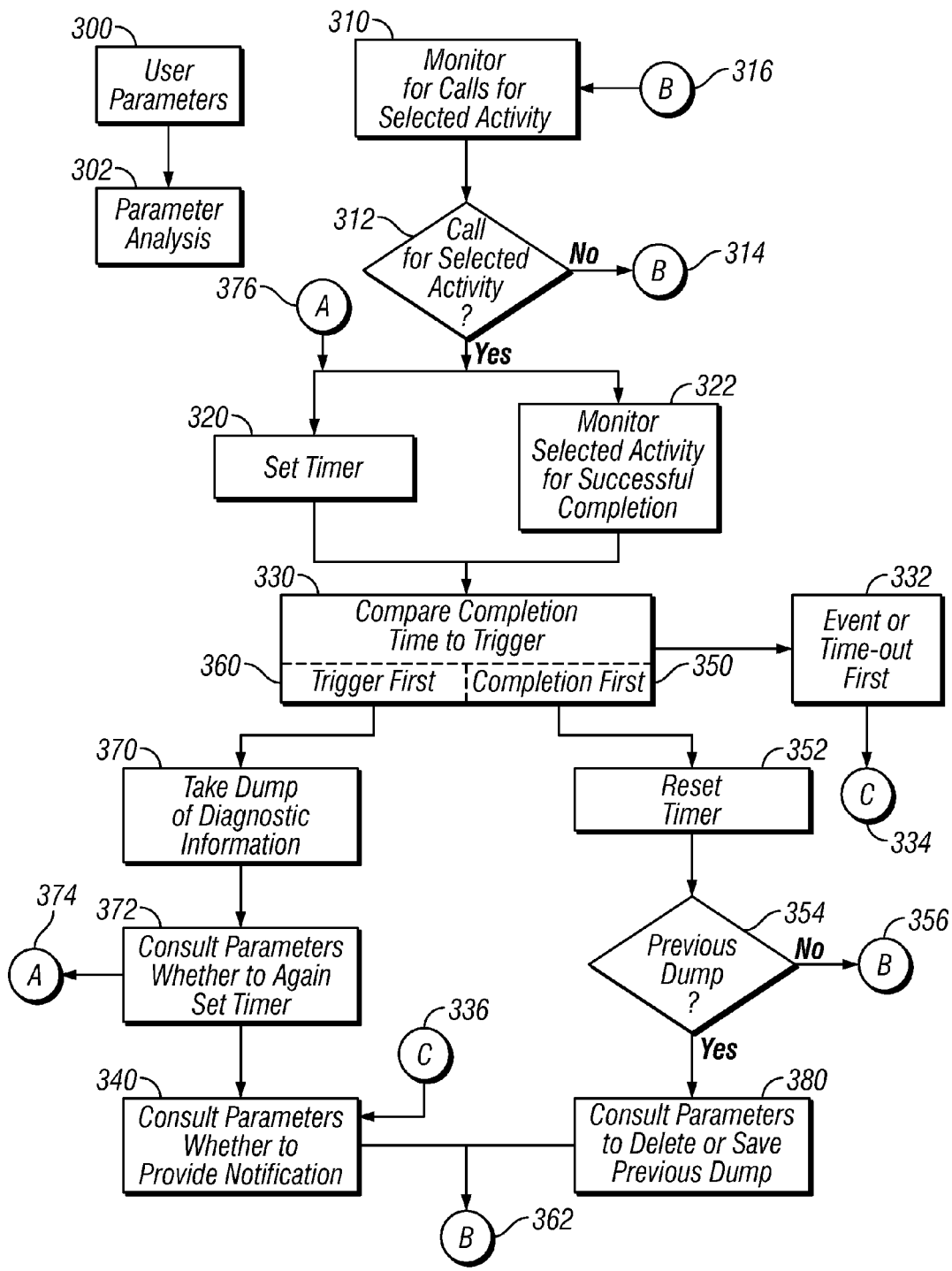
FIG. 3 is a flow diagram showing one embodiment of a method for providing monitoring of activity of the computer-implemented system of FIG. 1 and collecting diagnostic information.

Referring to FIGS. 2 and 3, the present invention monitors at least one selected activity of the computer-implemented system 100 of FIG. 1 from initiation of the activity, and monitors the activity for successful completion. The invention provides early collection of diagnostic information by comparing the time of the activity without successful completion to an initial trigger to collect diagnostic information and to take a dump of that information, where the initial trigger is less than the time period for a time-out for the activity. If the time of the activity without successful completion exceeds the initial trigger, diagnostic information is collected and an initial dump of the diagnostic information is taken. In one embodiment, if the activity fails to complete successfully by the time-out period, a notification is directed to the host or diagnostic terminal 206. The notification is that the dump of diagnostic information has been taken.

The monitoring may be selected by the user to be either of two modes, error only collection, or performance and error collection. The same monitoring and data collection is used for both modes, and the difference is in the deleting or retention of collected diagnostic information when there is no error or time-out event.

Still referring to FIGS. 2 and 3, the user establishes the user parameters of step 300, and provides the user parameters to the user parameters module 214 via interface 210. The user parameters include such things as selecting the activity or type of activity to be monitored. Examples of activities that could be monitored comprise Supervisor calls (SVC), which are service calls on an IBM® z/OS™ (International Business Machines Corp.), such as (1) request to an access method to store or retrieve data, (2) network data transmission request, (3) request to update the system catalog.

The user parameters of step 300 also indicate what the call for the selected activity is and indicate the signals that indicate a successful completion. Further, error indicators and failure to complete (if any) indicators are provided. Selections of timing intervals may also be made.

Step 302 is conducted by module 216 in conjunction with the monitoring 218 and activity analysis 224 modules.

Step 302 comprises, in one embodiment, setting the timing of triggers that will provide early collection of diagnostic information before a time-out of the activity, but that will also avoid burdening the system by taking too many sets of diagnostic information, especially if the activity instead completes successfully such that the diagnostic information is not needed. In one embodiment, step 302 constitutes a data collection phase to ascertain the times taken for successful completion of the activity. These times are analyzed to form a statistical basis for determining a measured standard deviation of the times taken for successful completion of the activity. As one example, the selected activity may be monitored for a one month.

As an example, it may be desirable to be able to monitor all types of SVC activities, but all SVCs are different, and each type of SVC will on average take a different amount of time than other types of SVCs. For example, a catalog request may generally take longer than another SVC request. The timing can also vary greatly by the user's environment. For example, if a client has very large catalogs that are poorly tuned, a catalog call may take longer than that of another user's system. Thus, step 302 data collection within the user's environment is an important facet of the set up for the invention.

Data collection may be separated, not only by the type of SVC request, but by sub-types of requests. For example, the analysis may comprise determining the length of time utilized for different types of catalog requests.

In one embodiment, once the statistical information is collected and calculated for each SVC or SVC sub-type (where present to be measured), the standard deviation is then calculated for each.

Default timings for the initial triggers and following triggers are then set based on the standard deviation. As one example, a default for the initial trigger may be set a 5 times the standard deviation for each of the SVC types or sub-types that were measured. These trigger times can later be adjusted higher if there is a need to reduce false hits or lower if errors have been missed or there is poor performance. Additional triggers are set to catch situations where there is no error or successful completion is extremely late or does not occur, as in case of a hang or non-terminating loop. As an example, each additional trigger is 4 times that of the trigger that it follows. Thus, where the standard deviation is 200 milliseconds, the initial trigger is set to 1000 milliseconds, the next trigger is 4×1000 milliseconds, and the third trigger is set to 4×4×1000 milliseconds. The value of 4 is adjustable by the user in setting the user parameters in step 300. The subsequent triggers allow for several dumps to be taken of an error event, so that any changes in storage during the error can be analyzed. The time closest to the error is the most valuable, and is the initial trigger, and fewer of the later dumps are taken as the event proceeds. As the result, in one embodiment, each successive collection and dump is taken at a timing having an exponential increase over the initial trigger, such that fewer dumps are taken as the activity proceeds.

Still referring to FIGS. 2 and 3, module 216 operates the computer-implemented system 200 in accordance with the user parameters and analysis, above, to monitor selected activities. In one embodiment, the number of activities to be monitored for the purpose of taking early dumps of diagnostic information is limited to two, so that an overall system slowdown is not compounded by exponential error event tasks. Again, this is a user tunable value, at terminal 206, so that the user can increase or decrease the tasks limit. The user may also select the specific activity or activities to be monitored.

In step 310, the computer-implemented system 100 of FIG. 1 is monitored for calls for the selected activity. For example, the activity to be monitored may comprise a Supervisor call that is specifically a catalog request type. The monitoring is conducted by module 216 by calling module 218. As an example, such supervisor calls are constantly being issued and it is easy to intercept and track the entry to and return from each of the SVCs using standard front ending or hooking techniques as known to those skilled in the art. Step 312 indicates the continued monitoring in that if no call for the selected activity is detected the process flows via connectors 314 and 316 to continue monitoring in step 310. Should a call for the selected activity be detected in step 312, the process flows to steps 320 and 322.

Step 320 sets the initial trigger in accordance with the parameter analysis of step 302 or in accordance with a specific setting by the user in the user parameters 214. As discussed above, the initial trigger may be set to 5 times the standard deviation. Timer control module 220 sets timer 222 to the desired value of the initial trigger, for example by calling a system service that handles timers.

Step 322 monitors the selected activity as it is conducted by employing monitoring module 218 to look for specific signals that indicate a successful completion or event, or a time-out as indicated by the system 100 of FIG. 1.

Step 330 checks for expiration of the timer 222 and for successful completion of the selected activity as indicated by monitoring module 218, and specifically checks for which occurs first. Another item checked for in step 330 is an error event with respect to the selected activity, and the error event may be indicated by the monitoring module 218. Detection of an error event occurs in step 332, and connectors 334 and 336 lead to step 340 where module 216 consults the parameters 214 to determine whether to send an indication to the terminal 206 about the error and the lack of early collection of diagnostic information. Detection of the error event before the initial trigger comprises a missed activation of the initial trigger, and may be an indication that the initial trigger is set at too long a time period. The initial trigger is adjustable and either subsequent analysis by the system in step 302 or analysis by the user may result in shortening the trigger time, especially if there becomes a substantial number missed initial triggers for error events.

If step 330 detects successful completion of the selected activity before the timer 222 expires, there cannot be an error event and there is also no need for performance analysis. This is outcome 350 of step 330. As the result, the timer is reset in step 352 and step 354 determines whether there was a previous dump of diagnostic information. In the example, since the timer was for the initial trigger, there is no previous dump, and connectors 356 and 316 lead to step 310 to again monitor calls for the selected activity.

If, however, step 330 does not detect successful completion of the selected activity before the timer 222 expires, an error, hang or non-terminating loop is possible, and the expiration of the timer provides the initial trigger. This is outcome 360.

The initial trigger 360 comprises taking step 370, calling diagnostic collection and dump control module 226 to collect diagnostic information relating to the selected and monitored activity, before an error is reported, and thereby comprising early collection of the diagnostic information. Once the diagnostic information is collected, step 370 takes a dump of the diagnostic information, for example, storing the information in dump storage 240.

In step 372, module 216 consults the parameters 214 to determine whether there is a subsequent trigger, and, if so, via connectors 374 and 376, again sets the timer 222 in step 320 and continues the monitoring process of step 322. The timer setting is to the second trigger. For example, if the initial trigger is 1000 microseconds, the second trigger may be set to 4×1000 microseconds.

Still referring to FIGS. 2 and 3, step 320 sets the second trigger by having timer control module 220 set timer 222 to the desired value of the second trigger, for example by calling a system service that handles timers.

Step 322 continues to monitor the selected activity as it is conducted, by employing monitoring module 218 to look for specific signals that indicate a successful completion or event, or a time-out as indicated by the system 100 of FIG. 1.

Step 330 checks for expiration of the timer 222 and for successful completion of the selected activity as indicated by monitoring module 218, and specifically checks for which occurs first. Another item checked for in step 330 is an error event with respect to the selected activity, and the error event may be indicated by the monitoring module 218. An error event is considered more likely if the initial trigger was selected correctly, since no successful completion occurred.

Detection of an error event occurs in step 332, and connectors 334 and 336 lead to step 340 where module 216 consults the parameters 214 to determine whether to send an indication to the terminal 206 about the error. Detection of the error event after the initial trigger but before the second trigger may be an indication that the initial trigger is set correctly in step 302.

If step 330 detects successful completion of the selected activity before the timer 222 expires for the second trigger, this is outcome 350 of step 330. Thus, the timer is reset in step 352 and step 354 determines whether there was a previous dump of diagnostic information, which there was.

If step 330 detects successful completion of the selected activity before the timer 222 expires for the second trigger, there may be a need for performance analysis. Thus, step 380 operates module 216 to consult the parameters 214 to determine whether to delete or retain the initial dump of diagnostic information. Also, step 340 operates module 216 to consult the parameters 214 to determine whether to send an indication to the terminal 206 about the late successful completion, and whether to log the occurrence of the initial dump or to provide an alternate notification to indicate that the initial dump was retained.

Alternatively, step 340 operates module 216 to consult the parameters 216 to determine whether the initial trigger was a false positive activation, and not a performance issue. If a false positive activation is indicated, the initial trigger should be adjusted to allow more time in step 300 or step 302.

Because of the successful completion of the activity, connectors 362 and 316 lead to step 310 to again monitor calls for the selected activity.

If, however, step 330 does not detect successful completion of the selected activity before the timer 222 expires, an error, hang or non-terminating loop is possible, and the expiration of the timer provides the initial trigger. This is outcome 360.

The second trigger 360 comprises taking step 370, calling diagnostic collection and dump control module 226 to collect a second set of diagnostic information relating to the selected and monitored activity, before an error is reported, comprising another early collection of the diagnostic information. Once the diagnostic information is collected, step 370 takes a dump of the diagnostic information, for example, storing the information in dump storage 240.

In step 372, module 216 consults the parameters 214 to determine whether there is a subsequent trigger, and, if so, via connectors 374 and 376, again sets the timer 222 in step 320 and continues the monitoring process of step 322. The timer setting is to a successive trigger. For example, if the second trigger is 4×1000 microseconds, the next trigger is 4×4×1000 microseconds. Still successive triggers, if any, may have exponential increases as discussed above.

When successive triggers are set in step 320 and the activity is continued to be monitored in step 322 without successful completion of the activity, a hang or non-terminating loop may have occurred, leading to a time-out event for the activity, which is detected by step 330 in step 332. Thus, in the case of a time-out event, connectors 334 and 336 lead to step 340 where module 216 consults the parameters 214 to determine whether to send an indication to the terminal 206 about the error. Detection of the time-out event is not only an error that is needed to be reported, but additionally requires notification that the initial and any successive dumps of diagnostic information have been taken and are stored in dump storage 240 for both error reporting and for performance monitoring if the system 200 is in performance monitoring mode.

Thus, the system 200 of FIG. 2 and method of FIG. 3, provide early collection and dumps of diagnostic information by monitoring at least one selected activity of the computer-implemented system from initiation for successful completion; comparing the time of the activity without successful completion to an initial trigger, the initial trigger less than the time period for a time-out for the activity; and if the time of the activity without successful completion exceeds the initial trigger, collecting and taking an initial dump of diagnostic information.

A person of ordinary skill in the art will appreciate that the embodiments of the present invention, disclosed herein, including the computer-implemented system 200 for monitoring selected activities of the system 100 of FIG. 1 and collecting diagnostic information, and the functionality provided therein, may be embodied as a system, method or computer program product. Accordingly, embodiments of the present invention may take the form of an entirely hardware embodiment, an entirely software embodiment (including firmware, resident software, micro-code, etc.) or a combination thereof, such as an embodiment combining software and hardware aspects that may all generally be referred to herein as a "circuit," "module" or "system." Furthermore, embodiments of the present invention may take the form of a computer program product embodied in one or more computer readable medium/media having non-transitory computer readable program code embodied thereon.

Any combination of one or more computer readable medium/media may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Those of skill in the art will understand that changes may be made with respect to the methods discussed above, including changes to the ordering of the steps. Further, those of skill in the art will understand that differing specific component arrangements may be employed than those illustrated herein.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. In a computer-implemented system, the method comprising:
    monitoring at least one selected activity of said computer-implemented system from initiation for successful completion;
    comparing time of said activity without said successful completion to an initial trigger, said initial trigger less than time period for time-out for said activity; and
    if said time of said activity without said successful completion exceeds said initial trigger, collecting and taking an initial dump of diagnostic information.

2. The method of claim 1, wherein, if said activity fails to complete successfully by said time-out period, providing a notification that said initial dump of diagnostic information has been taken.

3. The method of claim 2, wherein, if said initial trigger is exceeded but said activity completes successfully by said time-out period, said initial dump of diagnostic information is deleted, and the occurrence of said initial dump is logged.

4. The method of claim 2, wherein, if said initial trigger is exceeded but said activity completes successfully by said time-out period, said initial dump of diagnostic information is retained and an alternate notification is provided.

5. The method of claim 1, wherein said initial trigger comprises a multiple of a measured standard deviation of times for successful completion of said activity.

6. The method of claim 5, additionally comprising initially analyzing said selected activity to ascertain a statistical basis for determining said standard deviation.

7. The method of claim 6, wherein false positive activation of said initial trigger comprises successful completion of activity subsequent to said initial trigger; missed activation of said initial trigger comprises indication of an error related to said activity without activation of said initial trigger; and said initial trigger is adjustable in response to said false positive activation and said missed activation.

8. The method of claim 1, additionally comprising:
    subsequent to said initial trigger and said initial dump, collecting and taking successive dumps of diagnostic information with respect to said activity so long as said activity fails to complete successively and before said time-out period is exceeded.

9. The method of claim 8, wherein said initial trigger comprises a multiple of a measured standard deviation of times for successful completion of said activity, and wherein each said successive dump is collected and taken at a timing having an exponential increase over said initial trigger, such that fewer dumps are taken as said activity proceeds.

10. A computer program product to generate diagnostic information of a computer-implemented system, comprising computer-usable storage medium having non-transitory computer-usable program code embodied therein, said computer-usable program code comprising:
    computer-usable program code to monitor at least one selected activity of said computer-implemented system from initiation for successful completion;
    computer-usable program code to compare time of said activity without said successful completion to an initial trigger, said initial trigger less than time period for time-out for said activity; and
    computer-usable program code to, if said time of said activity without said successful completion exceeds said initial trigger, collect and take an initial dump of diagnostic information.

11. The computer program product of claim 10, comprising computer-usable program code to, if said activity fails to complete successfully by said time-out period, provide a notification that said initial dump of diagnostic information has been taken.

12. The computer program product of claim 11, comprising computer-usable program code to, if said initial trigger is exceeded but said activity completes successfully by said time-out period, delete said initial dump of diagnostic information, and log the occurrence of said initial dump.

13. The computer program product of claim 11, comprising computer-usable program code to, if said initial trigger is exceeded but said activity completes successfully by said time-out period, retain said initial dump of diagnostic information and provide an alternate notification.

14. The computer program product of claim 10, wherein said initial trigger comprises a multiple of a measured standard deviation of times for successful completion of said activity.

15. The computer program product of claim 14, additionally comprising computer-usable program code to initially analyze said selected activity to ascertain a statistical basis for determining said standard deviation.

16. The computer program product of claim 15, wherein false positive activation of said initial trigger comprises successful completion of activity subsequent to said initial trigger; missed activation of said initial trigger comprises indication of an error related to said activity without activation of said initial trigger; and said initial trigger is adjustable in response to said false positive activation and said missed activation.

17. The computer program product of claim 10, comprising computer-usable program code to:
    subsequent to said initial trigger and said initial dump, collect and take successive dumps of diagnostic information with respect to said activity so long as said activity fails to complete successively and before said time-out period is exceeded.

18. The computer program product of claim 17, wherein said initial trigger comprises a multiple of a measured standard deviation of times for successful completion of said activity, and wherein each said successive dump is collected and taken at a timing having an exponential increase over said initial trigger, such that fewer dumps are taken as said activity proceeds.

19. A computer-implemented system, comprising:
    at least one computer system comprising:

at least one computer-usable storage medium having non-transitory computer-usable program code embodied therein; and at least one computer processor implementing said computer-usable program code to:

monitor at least one selected activity of said computer-implemented system from initiation for successful completion;

compare time of said activity without said successful completion to an initial trigger, said initial trigger less than time period for time-out for said activity; and if said time of said activity without said successful completion exceeds said initial trigger, collect and take an initial dump of diagnostic information.

20. The computer-implemented system of claim 19, wherein said at least one computer system additionally implements said computer-usable program code to, if said activity fails to complete successfully by said time-out period, provide a notification that said initial dump of diagnostic information has been taken.

* * * * *